US010036153B2

(12) United States Patent
Schless

(10) Patent No.: US 10,036,153 B2
(45) Date of Patent: Jul. 31, 2018

(54) TOILET DEVICE HAVING A BACKFLUSHING FUNCTION FOR A PARTICLE FILTER

(71) Applicant: SIEMENS AKTIENGESELLSCHAFT, Munich (DE)

(72) Inventor: Guenther Schless, Wesel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/514,542

(22) PCT Filed: Sep. 28, 2015

(86) PCT No.: PCT/EP2015/072212
§ 371 (c)(1),
(2) Date: Mar. 27, 2017

(87) PCT Pub. No.: WO2016/050670
PCT Pub. Date: Apr. 7, 2016

(65) Prior Publication Data
US 2017/0226726 A1 Aug. 10, 2017

(30) Foreign Application Priority Data
Sep. 30, 2014 (DE) .......................... 10 2014 219 824

(51) Int. Cl.
E03D 11/14 (2006.01)
E03D 5/00 (2006.01)
(Continued)

(52) U.S. Cl.
CPC ............ *E03D 11/14* (2013.01); *B01D 29/668* (2013.01); *B01D 29/68* (2013.01); *B01D 35/023* (2013.01);
(Continued)

(58) Field of Classification Search
CPC ........... E03D 5/006; E03D 11/14; E03D 1/32; E03D 1/34; B01D 29/668; B01D 29/68; B01D 35/023; B01D 35/153; C02F 1/001
(Continued)

(56) References Cited

U.S. PATENT DOCUMENTS

| 7,118,677 B2 | 10/2006 | Hoffjann et al. |
| 9,428,887 B2 | 8/2016 | Zahir et al. |
| 2015/0182887 A1* | 7/2015 | Wright ................. B01D 29/668 210/745 |

FOREIGN PATENT DOCUMENTS

| DE | 10229799 A1 | 1/2004 |
| DE | 102010007115 A1 | 8/2011 |
(Continued)

Primary Examiner — Tuan N Nguyen
(74) Attorney, Agent, or Firm — Laurence Greenberg; Werner Stemer; Ralph Locher

(57) ABSTRACT

A toilet device for a rail vehicle includes flushing water-carrying installations and wastewater-carrying installations. The flushing water-carrying installations include an intermediate reservoir for storing flushing water and a supply line for supplying the intermediate reservoir with flushing water. The supply line includes a filter for filtering the flushing water supplied to the intermediate reservoir. The supply line is connected to the intermediate reservoir such that flushing water from the intermediate reservoir can be returned through the filter. A backflushing line is connected to the filter and opens into a wastewater-carrying installation. A method for operating the toilet device includes supplying the flushing water through a filter to fill the intermediate reservoir, and flushing a flushable bowl with flushing water from the intermediate reservoir or backflushing the filter with flushing water from the intermediate reservoir and draining off the flushing water to a wastewater-carrying installation.

15 Claims, 3 Drawing Sheets

(51) Int. Cl.
  *B01D 29/66*  (2006.01)
  *B01D 35/02*  (2006.01)
  *B01D 29/68*  (2006.01)
  *E03D 1/34*  (2006.01)
  *E03D 1/32*  (2006.01)
  *B01D 35/153*  (2006.01)
  *C02F 1/00*  (2006.01)

(52) U.S. Cl.
  CPC ............ *B01D 35/153* (2013.01); *C02F 1/001* (2013.01); *E03D 1/32* (2013.01); *E03D 1/34* (2013.01); *E03D 5/006* (2013.01); *B01D 2201/202* (2013.01); *C02F 2201/001* (2013.01)

(58) Field of Classification Search
  USPC .......................................................... 4/434
  See application file for complete search history.

(56) References Cited

FOREIGN PATENT DOCUMENTS

| | | | |
|---|---|---|---|
| DE | 202013009406 | U1 | 12/2013 |
| DE | 102013205084 | B3 | 5/2014 |
| EP | 2484574 | A1 | 8/2012 |
| EP | 2524998 | A1 | 11/2012 |
| JP | 2001079594 | A | 3/2001 |
| RU | 2516916 | C2 | 5/2014 |

\* cited by examiner

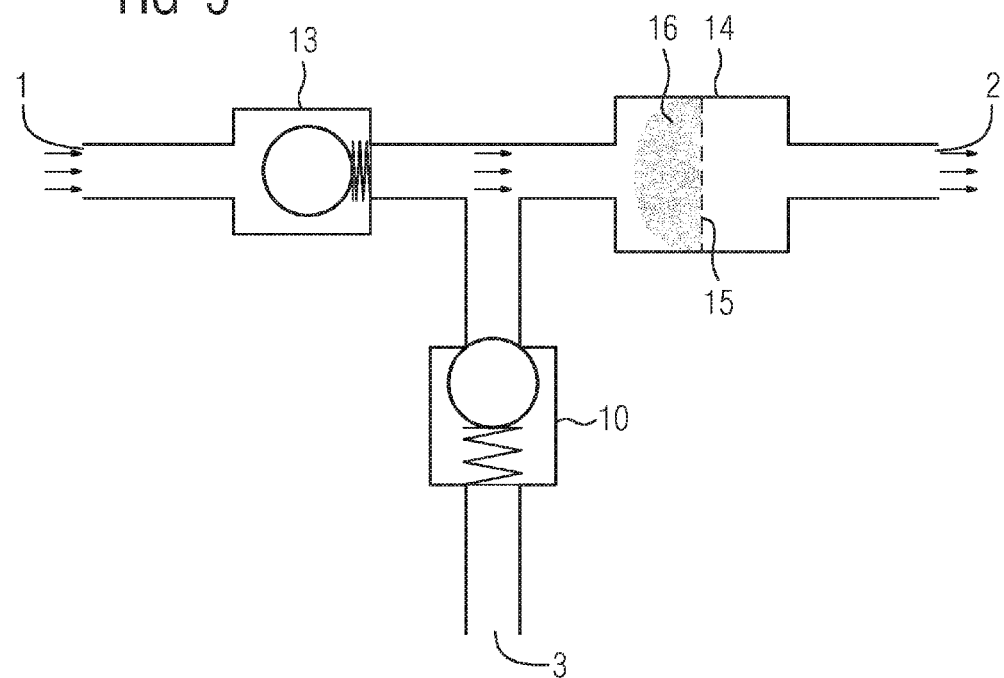
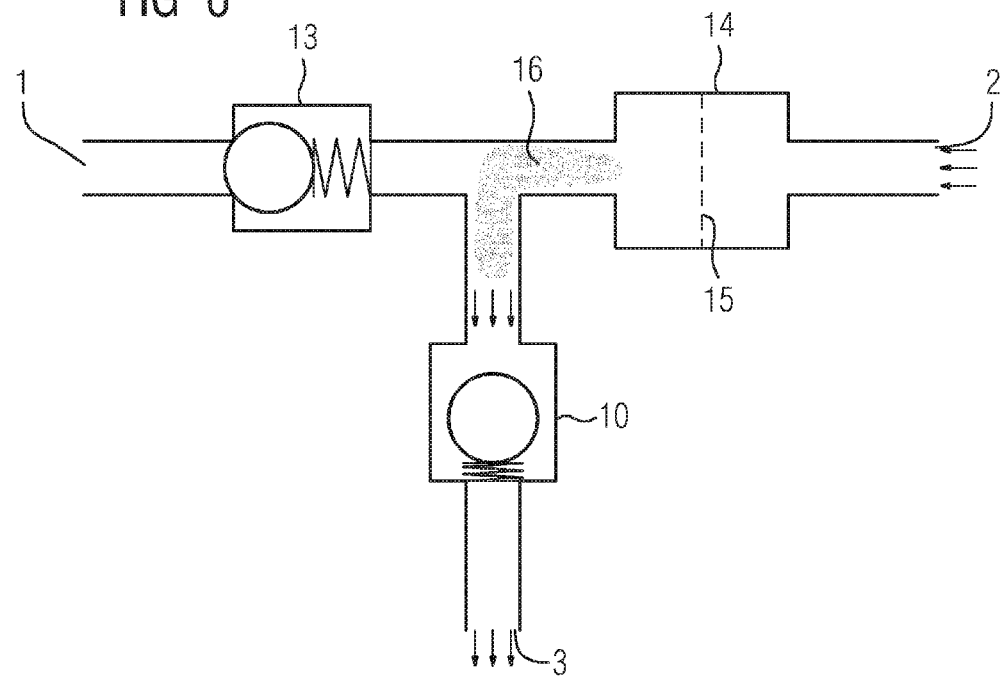

TOILET DEVICE HAVING A BACKFLUSHING FUNCTION FOR A PARTICLE FILTER

BACKGROUND OF THE INVENTION

Field of the Invention

The invention relates to a toilet device for a rail vehicle comprising flushing water-carrying installations and waste water-carrying installations and a method for operating the toilet device, wherein the flushing water-carrying installations comprise an intermediate tank for the storage of flushing water and a supply line for supplying flushing water to the intermediate tank, wherein the supply line comprises a filter for filtering the flushing water supplied to the intermediate tank.

Compact vacuum toilets are routinely used for toilet facilities in rail vehicles. They are supplied with an operating voltage, compressed air and fresh water for flushing. The systems are optimized for the smallest possible water consumption and have comparatively small cross sections in the supply and outlet water lines. The low water consumption during flushing and the small pipe cross sections mean that foreign bodies which are brought in with the fresh water can cause the clogging and blockage of components between a fresh-water connection and flushing nozzles of the toilet. Consequently, flushing nozzles and valves can thereby be damaged and the system can fail.

Foreign bodies can get into the water system of the toilet device in a variety of ways. Hence, for example, rust or sand can be carried along in the fresh water of a supply device arranged on the land side. Biomaterial or stones can also accumulate in fixed supply facilities such as tanks and lines of a filling station, for example, particularly when they are not closed. During a filling process, these foreign bodies are then washed into a fresh water tank of the rail vehicle, from which the flushing water for flushing the toilet originates. Also in tanks, lines and fittings of the rail vehicle, minerals and lime can be deposited and chip off again as flakes or particles and be carried along as foreign bodies.

In order to avoid toilet malfunctions and ensure uniform operation, fine-mesh filters are installed in the water supply line to the toilet. These have a mesh width which only allows particles to pass which are harmless to the installation system of the toilet device with lines, valves and flushing nozzles and holds back the other foreign bodies.

The filters must be regularly cleaned or even replaced. This requires the filters to be arranged in the line system in a correspondingly maintenance-friendly manner, something that in some places is associated with substantial structural effort. Consequently, the reliability and therefore the availability of the toilet device drop with the rising maintenance needs of the filter. This is in turn largely dependent on the state of the supply device on the land side or the hardness of the fresh water supplied.

In many cases it is problematic that the precise marginal conditions, in particular the land-side infrastructure, are not known or vary greatly from filling station to filling station. In many cases, no precise cleaning intervals for the filters can therefore be indicated, as a result of which the preventive maintenance intervals are short, so that reliable use of the toilet device can be guaranteed, even under poor marginal conditions.

SUMMARY OF THE INVENTION

The problem addressed by the invention is that of proposing a toilet device for a rail vehicle that can be operated in a cost-effective manner.

The problem is solved by the subject matter of the independent patent claims. Developments and embodiments of the invention are reproduced in the features of the dependent patent claims.

A toilet device for a vehicle according to the invention comprises flushing water-carrying installations and waste water-carrying installations. The flushing water-carrying installations comprise at least one intermediate tank for storing flushing water and at least one supply line. The at least one supply line is used for supplying the intermediate tank with flushing water and is connected to the at least one intermediate tank. In order to filter flushing water which is supplied to the intermediate tank by the supply line, the toilet device comprises at least one filter which is particularly arranged in the supply line.

In order to clean the at least one filter, the at least one supply line according to the invention is connected to the at least one intermediate tank in such a manner that flushing water can be conducted back from the intermediate tank through the filter. Furthermore, the toilet device according to the invention comprises a backflushing line for cleaning the at least one filter, said backflushing line being connected to the at least one filter and opening into at least one of the waste water-carrying installations.

The problem is also solved by a vehicle, in particular a rail vehicle in the public transport network, which comprises a toilet device according to the invention. Locomotives may also have toilet facilities of this kind. In addition to the aforementioned rail vehicles, this may also be an aircraft, a bus or a ship or ferry. Reference is only made to a rail vehicle below, although it will represent them all.

The flushing water supplied to the intermediate tank, also referred to as flushing liquid, is particularly drinking or fresh water. However, it may also be gray water from wash basins or it may, for example, be drinking water or fresh water which is mixed with cleaning and/or disinfecting agents. Even in the intermediate tank itself, filtered drinking or fresh water supplied to it could be mixed with cleaning and/or disinfecting means. It then has corresponding facilities.

The supply line is used to transport flushing water from a supply device to the intermediate tank. For this purpose, it is connected to the intermediate tank. The supply device itself may be contained in the rail vehicle itself, for example it may be a fresh water tank. In addition or alternatively, however, the supply device is an external facility that does not belong to the vehicle, for example an external tank or a drinking water network. The rail vehicle then includes a filler pipe, for example, at one end of the supply line, in order to connect up to an external supply facility. The other end of the supply line then opens into the intermediate tank.

The filter is particularly included with the supply line and is arranged in said supply line. It is used to filter flushing water supplied to the intermediate tank, in particular to filter particles from the flushing water, which are larger than a predetermined minimum size and which could clog up further flushing water lines or flushing nozzles downstream of the filter and/or of the intermediate tank. The filter has a suitable design, for example it is configured as a screen.

During the filling of the intermediate tank with flushing water from the supply device, the filter is arranged downstream between the supply device, for example a fresh water tank, and the intermediate tank. It may be connected directly to the intermediate tank—the other sections of the supply line then run exclusively between the filter and supply device—or at least one section of the supply line runs between the filter and the intermediate tank and at least one further section of the supply line runs between the supply device and the filter.

In order to clean the filter, flushing water from the intermediate tank is conveyed back through the filter and the particles retained in the filter are thereby released from the filter again and conveyed through the backflushing line into at least one of the waste water-carrying installations. For this purpose, the backflushing line is connected to at least one of the waste water-carrying installations in such a manner that the flushing water conveyed back through the filter from the intermediate tank is conducted into the waste water-carrying installations. In this case, the flushing water fed back though the filter may be conducted through at least one section of the supply line. This is particularly the case when the backflushing line is directly connected to the supply line between the supply device and the filter. Alternatively, the backflushing line is directly connected to at least one filter.

The backflushing line is used to conduct the flushing water flowing back through the filter from the intermediate tank during backflushing into at least one of the waste water-carrying installations, in particular it opens out into at least one waste water-carrying installation. As a development, the waste water-carrying installations comprise at least one bowl that can be flushed with flushing water, into which the backflushing line opens. The backflushing line is connected to the flushable bowl in such a manner that the flushing water conducted back through the filter from the intermediate tank is carried into the bowl. Alternatively, the backflushing line may also open out into another suitable environment, for example onto the track bed.

During the filling of the intermediate tank, said tank is filled at least partially with flushing water. On the other hand, during backflushing the intermediate tank is at least partly drained. A further, at least partial draining of the intermediate tank takes place during flushing. Water is then conveyed from the intermediate tank to the flushable bowl through at least one flushing water line which runs between the intermediate tank and the bowl. The flushing water line in this case may be directly connected to the intermediate tank and/or the bowl.

According to one embodiment, the flushable bowl comprises flushing nozzles for flushing the flushable bowl during flushing, which flushing nozzles are hydraulically connected to the flushing water line and into which the flushing water line opens out. In addition, the flushable bowl may comprise further backflushing openings that differ from the flushing nozzles, which backflushing openings are hydraulically connected to the backflushing line and into which the backflushing line opens out, in order to convey the flushing water away from the backflushing line into the bowl during backflushing. At least one backflushing opening is sufficient. It creates the outlet for the backflushing line and therefore acts as the filtrate discharge into the flushing bowl. The at least one backflushing opening could also be referred to as the backflushing nozzle, but it is not necessarily configured as a nozzle. The flushing nozzles may each have a smaller cross section than the backflushing opening.

According to a further development of the invention, the flushing water-carrying installations therefore comprise at least one flushing water line and at least one outlet valve in the at least one flushing water line. During flushing, the flushing water line serves to convey flushing water away from the intermediate tank and supply said flushing water to the flushable bowl. The flushing water line is used similarly to the supply and/or backflushing line to transport flushing water. The at least one outlet valve is used to control the flow of flushing water through the flushing water line. It may release, limit and/or interrupt the outflow of flushing water from the intermediate tank.

A valve is a shut-off device for shutting off or controlling the flow of fluids, in other words liquids and gases. A valve, viewed in isolation, should be referred to as the control member—and is therefore used to control the flow of fluid. It can be switched between at least two settings: an open and a closed state. Moreover, the valve may also adopt a partially open state, in order to limit the flow without interrupting it. If the valve is considered with a controller in an integrated system, said valve is used to control the flow of flushing water through the valve and therefore through the installations immediately adjacent to the valve.

In a development, the toilet device comprises at least one inlet valve in the at least one supply line, said inlet valve being arranged in the supply line between the filter and the intermediate tank, for example. The inlet valve is used to control the flow of flushing water through the supply line, in particular to control the inward flow of flushing water to the intermediate container, and also to control the backflow of flushing water from the intermediate container back at least through the filter as part of the supply line. It may, particularly during the filling of the intermediate tank, release, limit and/or interrupt the inward flow of flushing water to the intermediate tank. Equally, it may release, limit and/or interrupt the return flow of flushing water, at least through the corresponding section of the supply line with the inlet valve, and therefore the return flow of flushing water through the filter, particularly during backflushing.

It should be regarded as a further development of the invention that the toilet device comprises at least one device for the application of pressure to the flushing water in the intermediate tank, particularly in order to convey flushing water from the intermediate tank under pressure through the flushing water line to the flushable bowl and/or in order to convey flushing water from the intermediate tank under pressure at least through the filter to the backflushing line.

Likewise, the flushing water is still conveyed under pressure through the backflushing line to the flushable bowl.

The intermediate tank may be directly connected to a device of this kind for the application of pressure, in particular a compressed air device. Vehicles such as rail vehicles or coaches, for example, usually have a central compressed air supply with a compressed air-carrying compressed air installation and corresponding connections for connecting consumers. The intermediate tank is configured to be suitably connectable. The toilet device may comprise a compressed air valve between the compressed air installation of the rail vehicle and the intermediate tank, in order to control the application of pressure to the flushing water in the intermediate tank. The compressed air valve is used to release, limit and/or interrupt the supply of compressed air in the intermediate tank.

The device for pressure application is suitable and correspondingly configured to create an overpressure compared with the air pressure of the immediate environment of the intermediate tank in the intermediate tank.

Alternatively, an overpressure may also be produced in the intermediate tank with respect to the environment by a spring diaphragm or another suitable device.

The toilet device is in particular a vacuum toilet device.

According to a further development of the invention, it is provided that the backflushing line comprises an overpressure valve for closing the backflushing line as soon as the pressure of the flushing water drops below a predetermined threshold value. Similarly, the backflushing line is released again by the overpressure valve when the pressure of the flushing water reaches and/or exceeds the predetermined flushing value. The overpressure valve is particularly configured and arranged in the backflushing line in such a manner that it opens the backflushing line at a flushing water pressure value that is as great as or greater than the predetermined threshold value and closes the backflushing line at a flushing water pressure value that is lower than the predetermined threshold value.

In particular, the device for applying pressure to the flushing water in the intermediate tank causes the pressure of the flushing water flowing back out of the intermediate tank during backflushing to be significantly higher than the pressure of the flushing water supplied to the intermediate tank during flushing. The overpressure valve is configured in such a manner that it blocks a flow of flushing water through the backflushing line during the filling of the intermediate tank and thereby prevents water loss through the backflushing line and at the same time ensures that the flushing water is essentially completely supplied from the supply device to the intermediate tank and allows flushing water to pass through the backflushing line during backflushing. The threshold value is particularly dependent on the pressure of the flushing water in the intermediate tank. This is 0.3 bar above the ambient/atmospheric pressure, for example.

A further development of the toilet device comprises a non-return valve which is arranged in the supply line to prevent a backflow of flushing water from the filter to an outlet of the supply line opposite the intermediate tank, in other words away from the filter in the direction of the supply device, e.g. to a fresh water tank. For this purpose, the non-return valve closes the supply line for the backflow of flushing water from the filter to the outlet of the supply line opposite the intermediate tank. For the filling of the intermediate tank, on the other hand, the non-return valve allows the flushing water flowing to the intermediate tank to pass through.

According to a further development, the filter is configured as a Y-shaped pipe section and comprises a ring-shaped filter insert. The base of the Y-shaped pipe section in this case may be connected to the intermediate tank, wherein the two tips of the Y-shaped pipe section are, on the one hand, connected to the backflushing line and, on the other hand, to the part of the supply line that carries flushing water between the supply device and the filter. An alternative embodiment is conceivable. The filter insert is arranged in the Y-shaped pipe section in such a manner that it filters particles out of the flushing water which is supplied to the intermediate tank during the filling of said intermediate tank and thereby flows through the filter and that flushing water moving in the opposite direction can release the filtered-out particles from the filter, wherein the water can be deflected or is deflected into the backflushing line.

A method for operating a toilet device according to the invention envisages the following process steps:
   a) filling of the intermediate tank with flushing water, wherein the flushing water supplied to the intermediate tank is conveyed through a filter and thereby filtered;
   b) flushing of a flushable bowl with flushing water from the intermediate tank or
   c) backflushing of the filter with flushing water from the intermediate tank and diversion of the flushing water into a waste water-carrying installation.

It is not intended that the sequence of the individual process steps should to be prescribed here. So, for example, the process steps b) flushing and c) backflushing may also take place simultaneously.

During the filling of the intermediate tank, the flushing water to be supplied to the intermediate tank via a supply line with a filter is conveyed through the filter to the intermediate tank. In this case, the flushing water to be supplied to the intermediate tank is filtered by the filter.

In order to filter flushing water which is supplied to the intermediate tank during the filling thereof via the supply line and via the filter, the filter is installed upstream of the intermediate tank during filling.

Both during filling and also during backflushing, flushing water is conducted through the filter—but in different flow directions. During flushing, the intermediate tank is at least partly drained, similarly to the backflushing, but the flushing water is not conducted through the filter, but through the flushing water line, for example into the flushable bowl. The flushing of the flushable bowl with flushing water from the intermediate tank takes place particularly depending on actuation by a user, for example through actuation of a flushing push button, or at the request of a sensor with contactless actuation. The flow direction of the flushing water through the filter during the filling of the intermediate tank could be referred to as the filter direction and the opposing flow direction, in which the flushing water flows from the intermediate tank through the filter during backflushing, could similarly be referred to as the backflushing direction.

A development of the method according to the invention envisages that the toilet device comprises an inlet valve in the supply line, at least for controlling the supply of flushing water to the intermediate tank, wherein the inlet valve is at least partly open for carrying out the process step a) or is at least partly opened before the carrying out of process step a) and wherein the inlet valve is at least partly closed for the carrying out of process step b) or is at least partly open before the carrying out of process step b) or at least partly closed before the carrying out of process step b) and wherein the inlet valve is at least partly open for carrying out process step a) or is at least partly open before the carrying out of process step c).

The inlet valve is particularly arranged in the supply line between the filter and the intermediate tank.

The inlet valve is usually open prior to process step a) and closed again on completion of process step a), particularly when a predetermined nominal level of flushing water in the intermediate tank has been reached, so that it remains closed for the carrying out of process step b) and is opened again for the carrying out of process step c), wherein it is closed again on completion of process step c).

According to a further development, the toilet device comprises a flushing water line for the removal of flushing water from the intermediate tank to a flushable bowl and an outlet valve in the flushing water line for controlling the removal of flushing water from the intermediate tank to the flushable bowl, wherein the outlet valve for carrying out process step a) is at least partly closed or is at least partly closed before the carrying out of process step a) and wherein the outlet valve for carrying out process step b) is at least partly open or is at least partly open before the carrying out of process step b) and wherein the outlet valve is at least partly closed for the carrying out of process step c) or is at least partly closed before the carrying out of process step c).

Here, too, the outlet valve is usually closed after each flush, so following completion of the carrying out of process step b). It therefore remains closed for the carrying out of process steps a) and c) and is only opened to carry out process step b).

In a further embodiment of the invention, it is provided that the toilet device comprises in the supply line a non-return valve for closing the supply line for a flow of flushing water from the filter to an outlet of the supply line lying opposite the intermediate tank, for example a fresh water tank, wherein the non-return valve is at least partly open during the carrying out of process step a) and wherein the non-return valve is closed during the carrying out of process step b) and wherein the non-return valve is closed during the carrying out of process step c). Active actuation of the non-return valve from outside is not necessary. The non-return valve is actuated by the pressure of the flushing water.

The toilet device comprises in the backflushing line an overpressure valve for closing the backflushing line, wherein the overpressure valve is closed during the carrying out of process step a) and wherein the overpressure valve is at least partly open during the carrying out of process step c). The position of the overpressure valve is usually unimportant during the carrying out of process step b), as no pressure is applied to flushing water at the overpressure valve. Should this be the case, however, then the overpressure valve during the carrying out of process step b) is at least partly open. The overpressure valve is not actively actuated from outside either. It is opened by the flushing water. If the pressure in the backflushing line is too low, particularly if the pressure of the flushing water in the backflushing line is too low, the overpressure valve is closed.

Alternatively, instead of the overpressure valve, an actively actuated valve can also be inserted in the backflushing line.

In order to create overpressure, the flushing water in the intermediate tank is exposed to overpressure before the carrying out of process steps b) or c), particularly by means of a device for the application of pressure to the flushing water in the intermediate tank.

The backflushing and therefore the carrying out of process step c) is developed depending on a flow volume of flushing water through the filter detected in process step a) or depending on a pressure difference detected in process step a) in the supply line upstream and downstream of the filter or depending on a time detected for the filling of the intermediate tank with a predetermined amount of flushing water.

Alternatively, it may also be triggered manually or following a predetermined number of flushing cycles or after a predetermined period of time has elapsed.

The predetermined amount of flushing water is, in particular, the amount of flushing water between an output level detected prior to filling and a predetermined nominal level of flushing water.

The invention allows of numerous embodiments. It is explained in greater detail with the help of the following figures, in which an exemplary embodiment is depicted in each case. The same elements in the figures are provided with the same reference numbers.

BRIEF DESCRIPTION OF THE SEVERAL VIEWS OF THE DRAWING

FIG. 5 shows a further embodiment of a filter according to the invention in cross section, with flushing water flowing through the filter in the filter direction, FIG. 6 shows the filter according to the invention from FIG. 5 in cross section, with flushing water flowing through the filter in the cleaning direction.

DESCRIPTION OF THE INVENTION

Figure 1:
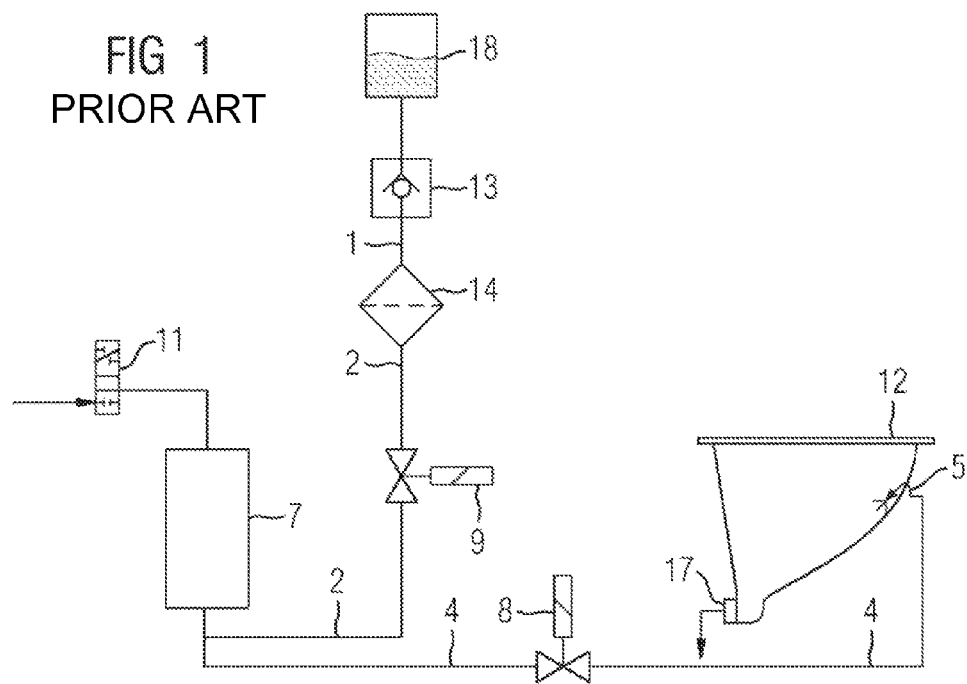
FIG. 1 shows a schematic diagram of a toilet device according to the state of the art.

A toilet device according to the state of the art is shown schematically in FIG. 1. It comprises an intermediate tank 7 which is hydraulically connected via a flushing water line 4 and an outlet valve 8 in the flushing water line 4 to a flushable bowl 12. The flushing water originating from the intermediate tank 7 and transported through the flushing water line 4 is ejected through flushing nozzles 5 into the flushable bowl 12.

In order to fill the intermediate tank 7, the toilet device comprises a supply line 1, 2 which, on the one hand, opens out in the intermediate tank 7 and, on the other hand, is connected to a fresh water tank 18 as the supply device. The supply line 1, 2 in this case is divided up by a filter 14. A first section of the supply line 1 is therefore arranged between the fresh water tank 18 and the filter 14, a second section of the supply line 2 runs between the filter 14 and the intermediate tank 7. The filter 14 itself could be referred to as the third section of the supply line. A non-return valve 13 prevents the backflow of flushing water through the first section of the supply line 1 from the filter 14 to the fresh water tank 18.

The intermediate tank 7 is connected to a device for the application of pressure to the flushing water in the intermediate tank 7; in this case the intermediate tank 7 is connected via a compressed air valve 11 to a compressed air installation. An inlet valve 9 can then also be provided in the second section of the supply line 2, in order to retain the pressure in the intermediate tank. Alternatively, the pressure in the intermediate tank 7 may also be produced by means of spring force and a diaphragm.

In the toilet device depicted, the bowl 12 is flushed with flushing water from the intermediate tank 7 which is pressed to one or more flushing nozzles 5 under the action of the pressure that has built up in the intermediate tank.

The intermediate tank 7 is filled with flushing water from the fresh water tank 18 through the non-return valve 13, the filter 14 and though the supply line 1, 2, if necessary following the opening of the inlet valve. When a nominal level is reached, the filling is terminated and the inlet valve is closed again if necessary.

In order to flush the bowl 12, the outlet valve 8 is opened, the pressure valve 11 is opened beforehand where necessary, in order to expose the flushing liquid in the intermediate tank to overpressure, and the flushing water flows through the flushing water line 4 and through the flushing nozzles 5 into the bowl 12. Finally, the content of the bowl is drained via the waste water line 17.

Figure 2:
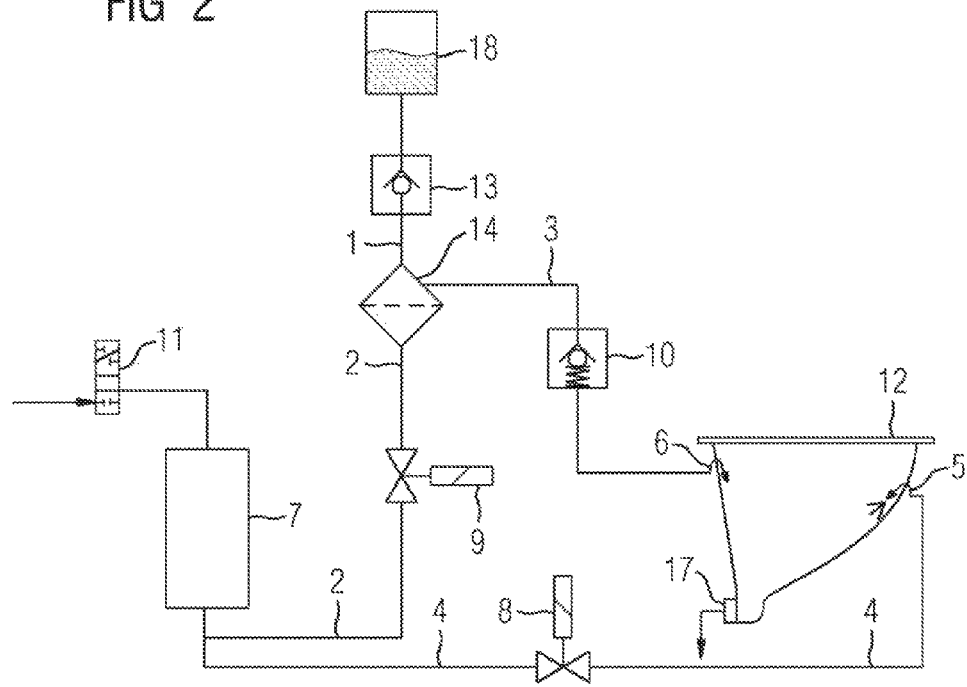
FIG. 2 shows a schematic diagram of a toilet device according to the invention.

The exemplary embodiment of a toilet device according to the invention schematically depicted in FIG. 2 comprises at least one bowl 12 that can be flushed with flushing water, at least one intermediate tank 7 for storing flushing water, at least one flushing water line 4 between the intermediate tank 7 and the flushable bowl 12, at least one device for producing the flushing pressure in the flushing line 4, at least one outlet valve 8 in the at least one flushing water line 4, at least one supply line 1, 2 for supplying flushing water to the intermediate tank 7 and at least one filter 14 in the supply line 1, 2 for filtering the flushing water supplied to the intermediate tank 7 through the supply line 1, 2 and through the filter 14 and also a backflushing line 3.

The flushing water line 4 is primarily used to convey flushing water out of the intermediate tank 7 to the flushable bowl 12. The outlet valve is likewise arranged between the intermediate tank 7 and the flushable bowl 12 and is used to control the flow of flushing water through the flushing water line 4 from the intermediate tank 7 to the flushable bowl 12.

The supply line 1, 2 in this case runs between a fresh water tank 18, as the supply device of the rail vehicle, and the intermediate tank 7. In this case, a first section of the supply line 1 is in turn arranged between the fresh water tank 18 and the filter 14 and a second section of the supply line 2 runs between the filter 14 and the intermediate tank 7.

A compressed air valve 11 via which the intermediate tank 7 is connected to a compressed air installation which is not shown and which carries compressed air is used here as the device for the application of pressure. Alternatively, the pressure may also be generated by a spring-loaded diaphragm or another suitable pump device.

The supply line 1, 2, in this case the second section of the supply line 2, is connected to the intermediate tank 7 in such a manner that flushing water from the intermediate tank 7 can be conveyed back through the filter 14. In this case, the second section of the supply line 2 opens out in the lower part of the intermediate tank 7.

The flushing water line 4 and the supply line 1, 2 in this case are jointly connected to the intermediate container 7. Alternatively, the aforementioned lines are connected to the intermediate tank 7 separately from one another.

Apart from the outlet valve 8 in the flushing water line 4 for controlling the flow of flushing water through the flushing water line 4, the toilet device in this case also comprises an inlet valve 9 in the supply line 2 for controlling the flow of flushing water through the supply line 2. The inlet valve 9 in this case is arranged between the filter 14 and the intermediate tank 7 in the second section of the supply line 2.

In order to clean the filter, the inlet valve 9 is opened and the pressurized flushing water flows out of the flushing water tank 7 through the second section of the supply line 2 to the filter 14 and against the filter direction through a filter insert.

Moreover, the toilet device has at least one backflushing line 3. It is used to transport flushing water flowing back from the intermediate tank 7 through the filter 14 into a waste water-carrying installation, in this case into the flushable bowl 12, and therefore to carry away the filtrate backflushed out of the filter.

In this case, the backflushing line 3 is, on the one hand, directly connected to the flushable bowl 12 and, on the other hand, directly connected to the filter 14. The connection of the filter 14 to the backflushing line 3 should be seen as hydraulic and not necessarily direct. Alternatively, the backflushing line 3 may also be connected to the supply line 1, 2, particularly to the first section of the supply line 1 lying downstream during the backflow. A branch and possibly a controllable or automatic switch point or a valve is then provided in the supply line 1, in order to conduct the backflow of flushing water through the backflushing line 3. As soon as the flushing water leaves the flushing nozzles 5, it is treated as waste water. The flushable bowl 12 is therefore included among the waste water-carrying installations. Examples of waste water-carrying installations, apart from the bowl 12, are also waste water pipes or a waste water tank, into which the backflushing line 3 can open out directly. Since the backflushing line itself conducts the flushing water contaminated with particles or foreign bodies released from the filter 14, the backflushing line 3 could also be included among the waste water-carrying installations.

When the inlet valve 9 is open, the supply line 1, 2 between the fresh water tank 18 and the intermediate tank 7 and the intermediate tank 7 can therefore be filled. Equally, the supply line 1, 2 is connected to the intermediate tank 7 in such a manner that when the inlet valve 9 is open, flushing water can flow back out of the intermediate tank 7 through the filter 14. The inlet valve 9 must be open both for the filling of the intermediate tank 7 and also for the cleaning of the filter 14. On the other hand, in order to flush the bowl 12 and avoid unnecessary water loss, the inlet valve 9 must otherwise be kept closed.

So that no flushing water is carried away through the backflushing line 3 during the filling of the intermediate tank 7, said backflushing line comprises an overpressure valve 10 which only allows flushing water which is at a predetermined pressure to pass through. The technical requirements of the overpressure valve 10 are low. It may be designed for maximum dirt resistance, as there are no mandatory water-saving obligations for this line branch. The overpressure valve 10 ensures that backflushing is carried out only above a minimum pressure.

The time taken to fill the intermediate tank 7 can be monitored, so that if there is a significant increase in the time taken, it can be concluded that the filter 14 is at least partially blocked. In order to avoid a malfunction of the entire toilet device, the filter 14 with the filter insert is then backflushed.

For the backflushing of the filter 14 with filter insert, the pressure is increased, in particular a predetermined backflushing pressure is set, in the intermediate tank 7 which is at least partially filled with flushing water, as in the case of normal flushing, by opening the pressure valve 11. Unlike in the case of normal flushing, the outlet valve 8 remains closed, however. Instead of this, the inlet valve 9 is opened. Flushing water then flows from the intermediate tank 7 against the filter direction of the filter 14 through the filter 14 and the filter insert. Since the non-return valve 13 is closed, the content of the filter 14 and the filter insert is flushed out and conducted through the backflushing line 3 to the backflushing opening 6 and from there into the bowl 12. Following the opening of the outlet valve 8 for complete pressure equalization, normal flushing of the bowl is initiated and the content of the bowl 12 is drained into the waste water system 17.

The backflushing process may take place continuously and with the complete volume of the intermediate tank 7 in one run or dynamically through cyclical opening and closing of the inlet valve. During dynamic flushing, the pressure fluctuations during the pulsing backflushing action influence the backflushing performance.

Figure 3:
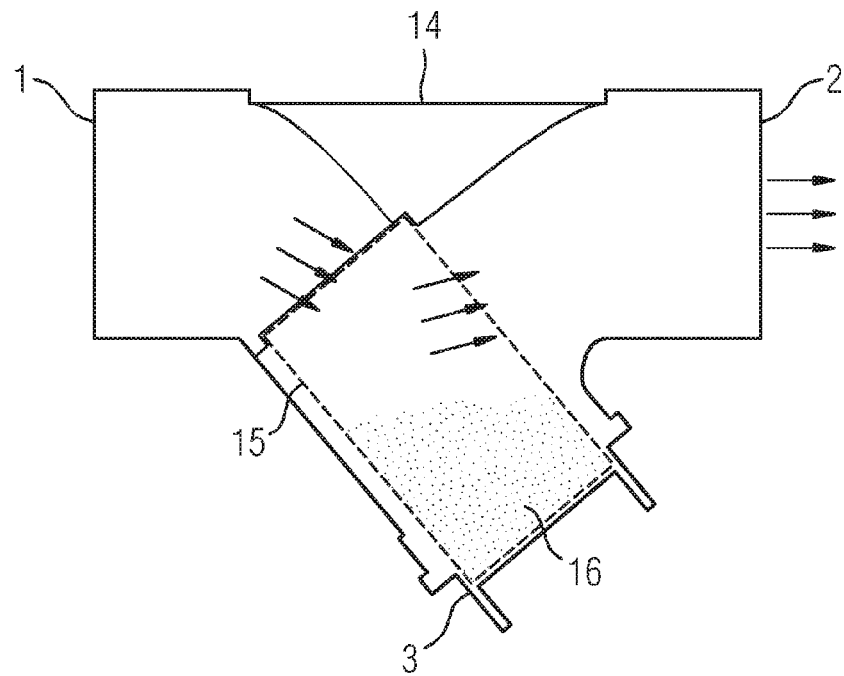
FIG. 3 shows a filter according to the invention in cross section, with flushing water flowing through the filter in the filter direction.
Figure 4:
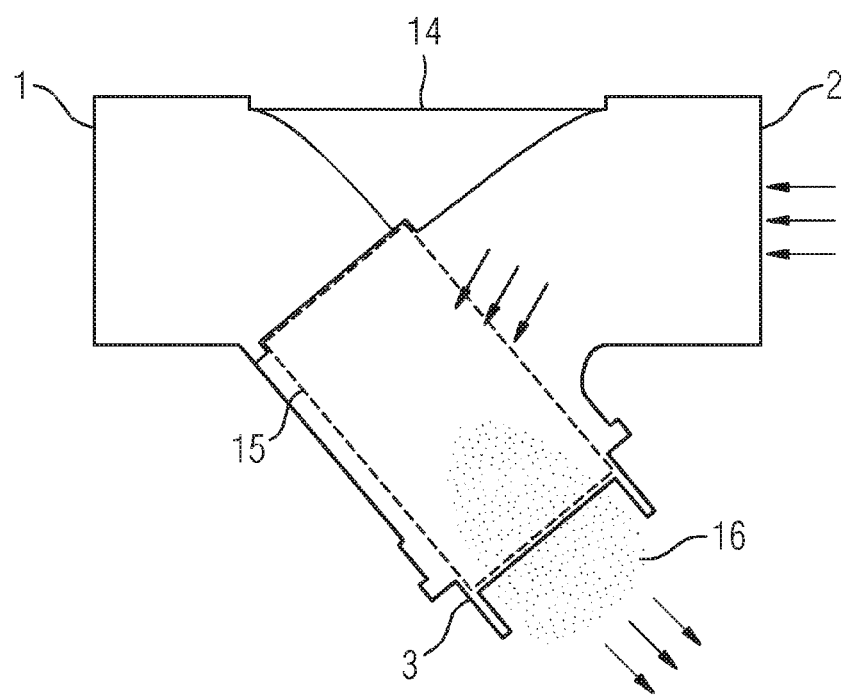
FIG. 4 shows the filter according to the invention from FIG. 3 in cross section, with flushing water flowing through the filter in the cleaning direction.

According to the schematic representations in FIG. 3 and FIG. 4, the filter 14 with filter insert in the supply line 1, 2 is provided with an additional outlet. Through this outlet, the content 16 of the filter insert 15 can be conducted through the backflushing line 3 into the bowl. Arrows in FIG. 3 in this case show the flow direction of the flushing water during a filling of the intermediate tank. In FIG. 4, on the other hand, the flow direction of the flushing water during backflushing is indicated.

The filter insert 15 is automatically and regularly cleaned. In this case, an at least large part of the filtrate 16 is disposed of in a non-hazardous manner. At least coarse and voluminous impurities are removed from the filter insert 15. Fine impurities are also reduced. In this way, the service life of the toilet device is substantially increased and the maintenance costs are reduced. Periods out of service can be avoided. The filtrate 16 is disposed of in the black water area. No manual actions are required. By using a filter 14 with a limited space requirement, a sanitary module in a rail vehicle can accommodate the entire toilet device, including entire backflushing installations. No further attachments or pipes outside the sanitary module are required. FIG. 5 and FIG. 6 show an alternative embodiment of the filter 14 and a different connection configuration from the configuration in FIG. 3 and FIG. 4. The filter 14 in this case is configured as a pipe section without a branch. It again comprises a filter insert 15 which filters particles which accumulate in the filter insert 15 out of the fresh water in a predetermined flow direction of the flushing water during a filling of the intermediate tank. The filter insert 15 is inserted in the filter accordingly.

FIG. 5 illustrates this filling process. Fresh water flows from the direction of the supply device through the supply line 1 and the non-return valve 13 opened in the flow direction, in order to pass through the filter 14 with its filter insert 15 further downstream in the filter direction. The pressure is not sufficient to open a non-return valve 10 which closes a backflushing line 3 which, for its part, is directly connected to the supply line 2 between the non-return valve 10 and the filter 14. The filtered fresh water is further supplied to the intermediate tank through the supply line 2.

In order to clean the filter insert 15 and remove the particles from the filter insert 15 in the flushing water line 3, as depicted in FIG. 6, flushing water is conveyed from the intermediate tank through the filter 14 in the backflushing direction. The non-return valve 10 opens the supply line 1 at the predetermined pressure; the non-return valve 13, conversely, closes it.

The invention claimed is:

1. A toilet device for a rail vehicle, the toilet device comprising:
    flushing water-carrying installations and waste water-carrying installations;
    said flushing water-carrying installations including an intermediate tank for storing flushing water;
    said flushing water-carrying installations including a supply line for supplying said intermediate tank with flushing water, said supply line including a filter for filtering the flushing water supplied to said intermediate tank, and said supply line being connected to said intermediate tank for conducting flushing water back from said intermediate tank through said filter; and
    a backflushing line connected to said filter and opening into one of said waste water-carrying installations.

2. The toilet device according to claim 1, wherein said waste water-carrying installations include a bowl to be flushed with flushing water, said backflushing line opening into said bowl.

3. The toilet device according to claim 1, which further comprises an inlet valve in said supply line, said inlet valve at least controlling a supply of the flushing water to said intermediate tank.

4. The toilet device according to claim 1, which further comprises a device for applying pressure to the flushing water in said intermediate tank.

5. The toilet device according to claim 1, wherein:
    said waste water-carrying installations include a flushable bowl; and
    said flushing water-carrying installations include a flushing water line for conveying the flushing water from said intermediate tank to said flushable bowl and an outlet valve in said flushing water line for controlling a removal of flushing water from said intermediate tank to said flushable bowl.

6. The toilet device according to claim 5, wherein said flushable bowl includes flushing nozzles hydraulically connected to said flushing water line, and said flushable bowl includes at least one backflushing opening hydraulically connected to said backflushing line.

7. The toilet device according to claim 1, wherein said backflushing line includes an overpressure valve for closing said backflushing line as soon as a pressure of the flushing water in said backflushing line drops below a predetermined threshold value.

8. The toilet device according to claim 1, wherein:
    said supply line includes one end connected to said intermediate tank and a further end disposed opposite to said one end; and
    said supply line includes a non-return valve for closing said supply line to a flow of flushing water from said filter to said further end of said supply line.

9. The toilet device according to claim 1, wherein said filter is a Y-shaped pipe section including a ring-shaped filter insert.

10. A rail vehicle, comprising at least one toilet device according to claim 1.

11. A method for operating a toilet device according to claim 1, the method comprising the following steps:
    a) providing flushing water-carrying installations including an intermediate tank for storing flushing water, a supply line connected to the intermediate tank and a filter in the supply line;
    b) providing waste water-carrying installations including a flushable bowl;
    c) providing a backflushing line connected to the filter and opening into one of the waste water-carrying installations;
    d) conveying the flushing water through the supply line with the filter to fill the intermediate tank; and
    e) flushing the flushable bowl with flushing water from the intermediate tank or
    f) backflushing the filter with the flushing water from the intermediate tank and diverting the flushing water through the backflushing line into one of the waste water-carrying installations.

12. The method according to claim 11, which further comprises:
    providing an inlet valve in the supply line to at least control a supply of the flushing water to the intermediate tank;
    the inlet valve being open or being opened to carry out step d),
    the inlet valve being closed or becoming closed to carry out step e), and
    the inlet valve being open or being opened to carry process step f).

13. The method according to claim 11, which further comprises:
    providing the flushing water-carrying installations with a flushing water line for conveying the flushing water from the intermediate tank to the flushable bowl and an outlet valve in the flushing water line for controlling a removal of flushing water from the intermediate tank to the flushable bowl;
    the outlet valve being closed or becoming closed to carry out step d),
    the outlet valve being open or being opened to carry out step e), and the outlet valve being closed or becoming closed to carry out step f).

14. The method according to claim 11, which further comprises exposing the flushing water in the intermediate tank to overpressure before carrying out steps e) or f).

15. The method according to claim 11, which further comprises carrying out step f):
depending on a flow volume of flushing water through the filter detected in step d) or
depending on a pressure difference detected in step d) in the supply line upstream and downstream of the filter or
depending on a time detected for filling the intermediate tank with a predetermined amount of flushing water in step d).

* * * * *